(12) United States Patent
Chun (10) Patent No.: US 8,976,314 B2
(45) Date of Patent: Mar. 10, 2015

(54) DISPLAY APPARATUS

(71) Applicant: Hyo-Seok Chun, Suwon-si (KR)

(72) Inventor: Hyo-Seok Chun, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 65 days.

(21) Appl. No.: 13/674,412

(22) Filed: Nov. 12, 2012

(65) Prior Publication Data

US 2013/0215359 A1    Aug. 22, 2013

(30) Foreign Application Priority Data

Feb. 21, 2012  (KR) .......................... 10-2012-0017335

(51) Int. Cl.
  *G02F 1/1333* (2006.01)
  *G02F 1/1345* (2006.01)
(52) U.S. Cl.
  CPC ........ *G02F 1/1333* (2013.01); *G02F 1/133308* (2013.01); *G02F 2001/133314* (2013.01); *G02F 2001/133317* (2013.01); *G02F 2001/13332* (2013.01); *G02F 2201/46* (2013.01)
  USPC .............. 349/58; 349/149; 349/150; 349/152
(58) Field of Classification Search
  CPC ............ G02F 1/1333; G02F 1/133308; G02F 2001/133314; G02F 2001/133317; G02F 2001/133322

USPC ............................................ 349/58, 149–152
See application file for complete search history.

(56) References Cited

U.S. PATENT DOCUMENTS

| 7,403,243 | B2 | 7/2008 | Fukuyoshi et al. |
| 7,724,315 | B2 | 5/2010 | Ryu et al. |
| 2003/0223020 | A1* | 12/2003 | Lee ................................. 349/58 |
| 2010/0296022 | A1* | 11/2010 | Ando .............................. 349/58 |

FOREIGN PATENT DOCUMENTS

| KR | 1020030073783 | 9/2003 |
| KR | 10-0873496 | 12/2008 |

\* cited by examiner

*Primary Examiner* — Nathanael R Briggs
(74) *Attorney, Agent, or Firm* — H.C. Park & Associates, PLC (57) ABSTRACT

A display apparatus including a top chassis, a display panel, a bottom chassis, a driving part, and a combining part. The display panel configured to display an image is disposed under the top chassis. The bottom chassis is disposed under the display panel. The bottom chassis is combined with the top chassis to receive the display panel. The driving part is electrically connected to the display panel to drive the display panel. The combining part is configured to combine the top chassis, the bottom chassis and the driving part.

20 Claims, 7 Drawing Sheets

DISPLAY APPARATUS

CROSS-REFERENCE TO RELATED APPLICATION

This application claims priority from and the benefit of Korean Patent Application No. 10-2012-0017335, filed on Feb. 21, 2012, which is hereby incorporated by reference for all purposes as if fully set forth herein.

BACKGROUND

1. Field

Exemplary embodiments of the present invention relate to a display apparatus. More particularly, exemplary embodiments of the present invention relate to a display apparatus capable of decreasing a thickness of the display apparatus and capable of simplifying an assembly process.

2. Discussion of the Background

Recently, a liquid display apparatus having light weight and small size has been manufactured. A cathode ray tube (CRT) display apparatus has been used in the past because of its good performance and competitive price. However, the CRT display apparatus suffers from the problems of large physical size, weight, and lack of portability. Therefore, the liquid display apparatus has been highly regarded as a result of its small size, light weight and low power consumption.

Generally, the liquid display apparatus applies a voltage to a specific molecular arrangement configured to change the molecular arrangement in response thereto. The liquid display apparatus displays an image using changes of optical property (for example, birefringence, rotatory polarization, dichroism, and light scattering) of a liquid crystal cell according to the changes of the molecular arrangement.

A typical liquid display apparatus includes a top chassis, a bottom chassis and a display panel having a printed circuit board (PCB) including a driving circuit.

However, the PCB of the typical liquid display apparatus is attached to the bottom chassis by a screw or tape. The bottom chassis and the top chassis are connected with a hook structure. However, the hook structure may cause an opening of the top chassis when a width of the bezel is large, so that a gap between the top chassis and the display panel may be formed.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide a display apparatus capable of reducing a thickness of the display apparatus, and simplifying a manufacturing process.

Additional features of the invention will be set forth in the description which follows, and in part will be apparent from the description, or may be learned by practice of the invention.

An exemplary embodiment of the present invention discloses a display apparatus including a top chassis, a display panel, a bottom chassis, a driving part and a combining part. The display panel displaying an image is disposed under the top chassis. The bottom chassis is disposed under the display panel. The bottom chassis is combined with the top chassis to receive the display panel. The driving part is electrically connected to the display panel to drive the display panel. The combining part is configured to combine the top chassis, the bottom chassis and the driving part.

An exemplary embodiment of the present invention also discloses a method of manufacturing a display apparatus in which a driving part is prepared between a top chassis and a bottom chassis; the bottom chassis is combined with the top chassis configured to receive a display panel; and the top chassis, the bottom chassis and the driving part are combined using a combining part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
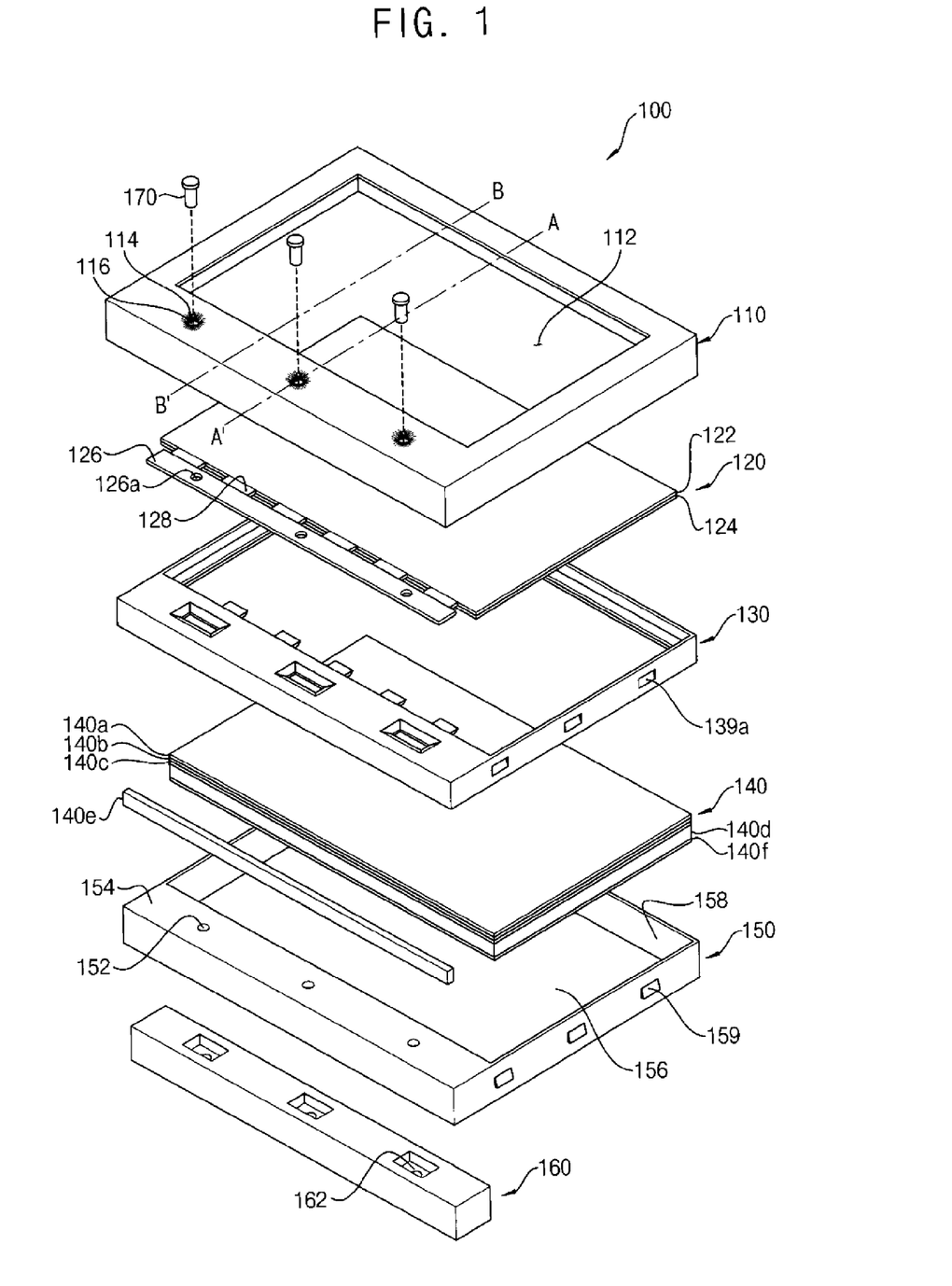
FIG. 1 is an exploded perspective view illustrating a display apparatus according to a first exemplary embodiment of the present invention.
Figure 2:
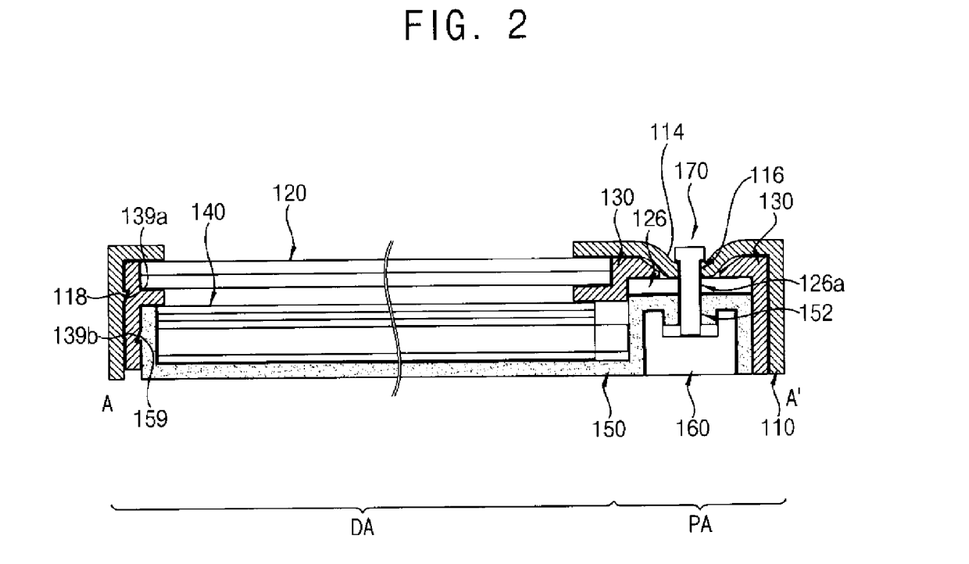
FIG. 2 is a cross-sectional view taken along a line A-A' of FIG. 1.
Figure 3:
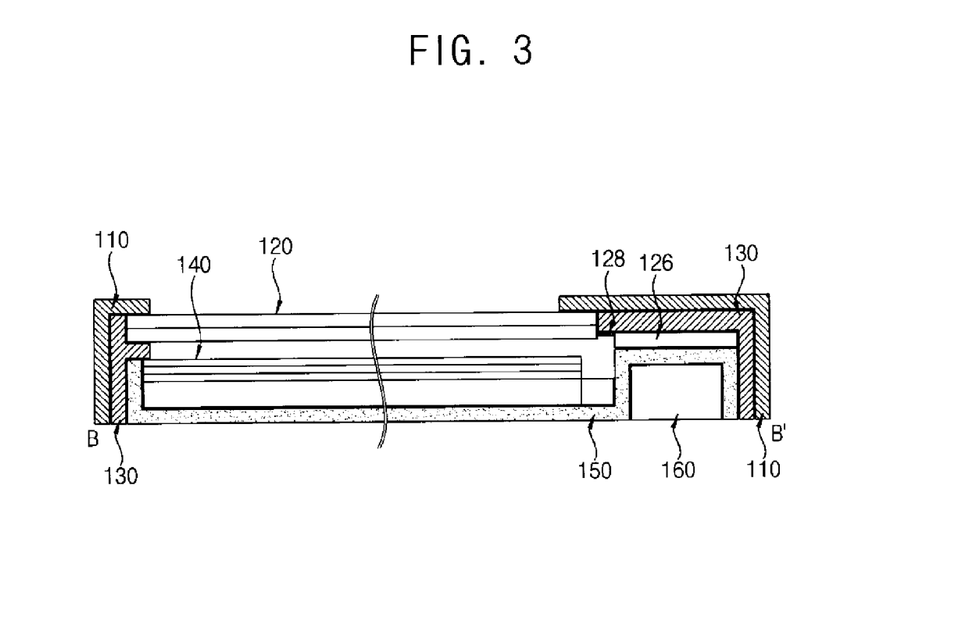
FIG. 3 is a cross-sectional view taken along a line B-B' of FIG. 1.

FIG. 1 is an exploded perspective view illustrating a display apparatus according to an exemplary embodiment of the present invention. FIG. 2 is a cross-sectional view taken along a line A-A' of FIG. 1. FIG. 3 is a cross-sectional view taken along a line B-B' of FIG. 1.

Referring to FIGS. 1 to 3, the display apparatus 100 includes a top chassis 110, a display panel 120, a mold frame 130, a backlight assembly 140, a bottom chassis 150, a bottom cover 160 and a combining part 170. The display apparatus 100 includes a display area DA and a peripheral area PA.

The top chassis 110 may cover a portion of the display panel 120. Alternatively, the top chassis 110 may entirely cover the display panel 120. The mold frame 130 receives the display panel 120 to hold the display panel 120. The backlight assembly 140 is disposed under the mold frame 130 and is received in the bottom chassis 150. The combining part 170 fixes the top chassis 110, a driving part 126 and the bottom chassis 150 to each other by piercing the top chassis 110, the driving part 126 and the bottom chassis 150. The bottom cover 160 is received in the bottom chassis 150, so that a portion of the combining part 170 is received in the bottom cover 160 and covered by the bottom cover 160.

The top chassis 110 holds the display panel 120. The top chassis 110 has a first opening 112. The display area DA of the display panel 120 is exposed through the first opening 112. A first hole 116 is formed at a boundary of the top chassis 110 in a plan view. The combining part 170 is inserted through the first hole 116, so that the top chassis 110, the driving part 126 and the bottom chassis 150 are combined with each other. The first hole 116 may be formed at a first recess 114 which is recessed from a surface of the top chassis 110. Thus, even though the combining part 170 is inserted through the first hole 116, the combining part 170 may be prevented from protruding from the surface of the top chassis 110.

The display panel 120 displays an image on the display area DA according to a driving signal and a data signal applied from outside using a light generated from the backlight assembly 140. The display panel 120 includes a first substrate 124, a second substrate 122 facing the first substrate 124, and a liquid crystal layer (not shown) disposed between the first substrate 124 and the second substrate 122. The display panel 120 is electrically connected to the driving part 126, which drives the display panel 120. For example, a flexible printed circuit board (FPCB) 128 connected to the driving part 126 may be formed. The driving part 126 may be disposed at a plane on which the display panel 120 is disposed. Thus, the driving part 126 is disposed adjacent to a side of the display panel 120, and is connected to the display panel 120 through the FPCB 128, so that a thickness of the display apparatus may be reduced as compared to a traditional display apparatus having a driving part disposed under a display panel.

The driving part 126 may include a printed circuit board to drive the display panel 120.

A second hole 126a is formed through the driving part 126. The second hole 126a is formed at an area corresponding to the first hole 116 of the top chassis 110. Thus, the combining part 170 may sequentially pass through the first hole 116 of the top chassis 110 and the second hole 126a of the driving part 126.

The mold frame 130 will be explained in detail with reference to FIGS. 1, 4, and 5.

The backlight assembly 140 may include one or more optical sheets 140a, 140b and 140c, a light guiding plate 140d, a light source assembly 140e, and a reflecting sheet 140f. The light source assembly 140e generates a light. The light source assembly 140e may include a point light source, a line light source, a surface light source, etc. For example, the light source assembly 140e may include a plurality of light emitting diodes (LEDs). The light guiding plate 140d changes the light having a point shape or a linear shape into a light having a surface shape. The light guiding plate 140d guides the light from the light source assembly 140e toward the display panel 120, so that the light guiding plate 140d changes a path of the light.

The optical sheets 140a, 140b and 140c increase a brightness uniformity of the light from the light guiding plate 140d. For example, the optical sheets 140a, 140b and 140c may include a protecting sheet 140a, a prism sheet 140b and a diffusion sheet 140c, respectively. The prism sheet 140b may further include an upper prism sheet and a lower prism sheet. In the exemplary embodiment of the present invention, the optical sheets may include the protecting sheet 140a, the prism sheet 140b, and the diffusion sheet 140c, although the exemplary embodiment is not to be construed as being limited thereto. The optical sheets may include various other optical sheets as well.

The reflecting sheet 140f is disposed under the light guiding plate 140d. The reflecting sheet 140f reflects a light exiting from a bottom surface of the light guiding plate 140d to a direction toward the display panel 120. Thus, the efficiency of the light of the backlight assembly 140 may be improved.

The bottom chassis 150 receives the backlight assembly 140. The bottom chassis 150 includes a receiving space and a peripheral portion 154. The receiving space is formed at an area corresponding to the display area DA. The peripheral portion 154 is formed at an area corresponding to the peripheral area PA. The receiving space includes a bottom portion 156 and a side wall 158. The peripheral portion 154 protrudes from the bottom portion 156. The peripheral portion extends from the side wall. The bottom portion, the side wall and the peripheral portion form a receiving space to receive the backlight assembly. For example, a cross section of the peripheral portion 154 may have a "C" shape. A fourth hole 152 is formed at the peripheral portion 154, so that the combining part 170 may be inserted through the fourth hole 152. Thus, the combining part 170 may inserted through the first hole 116 of the top chassis 110, the second hole 126a of the driving part 126, and the fourth hole 152 of the bottom chassis 150.

For example, the combining part 170 may include a screw. A helicoidal surface is formed inside of the fourth hole 152 of the bottom chassis 150. The screw is inserted through the first hole 116 of the top chassis 110 and the second hole 126a of the driving part 126, so that the screw is combined with the helicoidal surface of the fourth hole 152 of the bottom chassis 150. The fourth hole 152 is formed at the peripheral portion 154 protruding from the bottom chassis 150, so that a first recess 114 of the top chassis 110 makes contact with the driving part 126. The driving part 126 makes contact with the peripheral portion 154 of the bottom chassis 150. In the present exemplary embodiment, although the combining part 170 is sequentially inserted through the first hole 116 of the top chassis 110, the second hole 126a of the driving part 126 and the fourth hole 152 of the bottom chassis, the combining part 170 may be sequentially inserted through the fourth hole 152 of the bottom chassis 150, the second hole 126a of the driving part 126, and the first hole 116 of the top chassis 110.

The bottom cover 160 covers a rear surface of the peripheral portion 154 of the bottom chassis 150. The peripheral portion 154 of the bottom chassis 150 protrudes from the bottom portion 156, so that peripheral portion 154 forms a space. The bottom cover 160 is inserted into the space. A groove 162 may be formed on the bottom cover 160. A portion of the bottom chassis 150 and the combining part 170 may be received in the groove 162. A bonding layer (not shown) may be disposed between the bottom cover 160 and the bottom chassis 150, so that the bottom cover 160 may be attached to the bottom chassis 150.

The bottom chassis 150, the backlight assembly 140, the mold frame 130, the display panel 120, and the top chassis 110 are sequentially disposed in the display area DA. The bottom cover 160, the bottom chassis 150, the driving part 126, the mold frame 130, and the top chassis 110 are sequentially disposed in the peripheral are PA. In addition, in the peripheral are PA, the combining part 170 is inserted through the first hole 116 of the top chassis 110, the second hole 126a of the driving part 126, and the fourth hole 152 of the bottom chassis 150.

The FPCB 128 connects the first substrate 124 and the driving part 126 through a grooved portion 136b of the mold frame 130.

Figure 4:
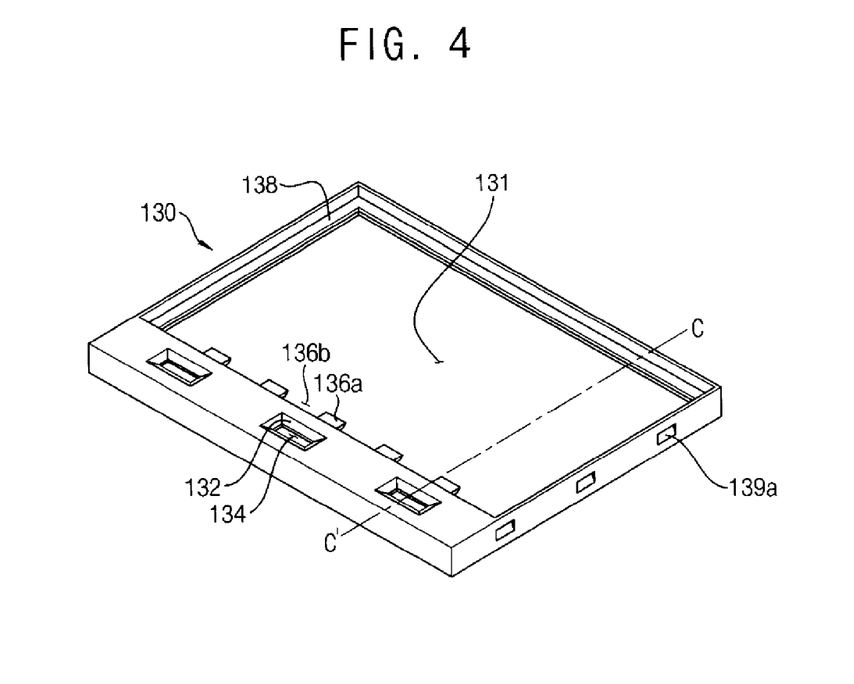
FIG. 4 is a perspective view illustrating a mold frame of FIG. 1.

FIG. 4 is a perspective view illustrating a mold frame of FIG. 1. FIG. 5 is a cross-sectional view taken along a line C-C' of FIG. 4.

Figure 5:
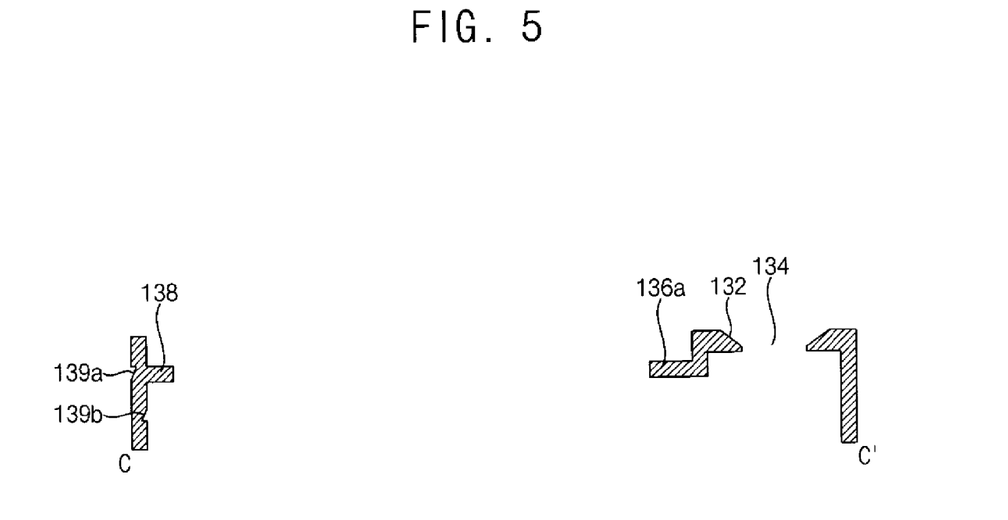
FIG. 5 is a cross-sectional view taken along a line C-C' of FIG. 4.

Referring to FIGS. 4 and 5, the mold frame 130 includes a second opening 131, a second recess 132, a third hole 134, a protrusion 136a, the grooved portion 136b, and a supporting portion 138. The mold frame 130 supports the display panel 120 and holds the display panel 120.

The second opening 131 is formed at an area where the backlight assembly 140 supplies light to the display panel 120. Thus, the light from the backlight assembly 140 may be supplied to the display panel 120 through the second opening 131. The second recess 132 is formed at the mold frame 130, and corresponds to the peripheral area (refer to PA of FIG. 2). The third hole 134 is formed at the second recess 132. Thus, the first recess 114 of the top chassis 110 is disposed at a space formed by the second recess 132 of the mold frame 130 and the third hole 134. For example, the second recess 132 may have a rectangular shape having a slanted surface. The third hole 134 may be an opening connected to the slanted surface. The first recess 114 may be received in a space formed by the slanted surface and the opening. The first recess 114 of the top chassis 110 is disposed in the space formed by the second recess 132 of the mold frame 130 and the third hole 134, so that the combining part 170 is sequentially inserted through the first hole 116 of the top chassis 110 and the second hole 126a of the driving part 126.

The protrusion 136a and the supporting portion 138 support the display panel 120 and hold the display panel 120. For example, the protrusion 136a and the supporting portion 138 are formed on the inner surface of the mold frame 130. The display panel 120 is disposed on the protrusion 136a and the supporting portion 138. The FPCB 128 is disposed through the grooved portion 136b, so that the FPCB 128 may pass the mold frame 130. Thus, when the display panel 120 including the driving part 126 and the FPCB 128 is combined with the mold frame 130, the display panel 120 may be disposed at the second opening 131 of the mold frame 130 and the driving part 126 may be disposed under the third hole 134 of the mold frame 130. At this time, the FPCB 128 passes through the grooved portion 136b, so that the FPCB 128 connects the first substrate 124 and the driving part 126.

A plurality of first combining grooves 139a may be formed outside of a side of the mold frame 130. The first combining protrusion 118 may be inserted into the first combining groove 139a. In addition, a plurality of second combining protrusions 159 may be formed outside of a side of the bottom chassis 150. A plurality of second combining grooves 139b may be formed inside of the side of the mold frame 130. The second combining protrusion 159 may be inserted into the second combining groove 139b. Thus, the top chassis 110, the mold frame 130 and the bottom chassis 150 may be combined together.

Figure 6:
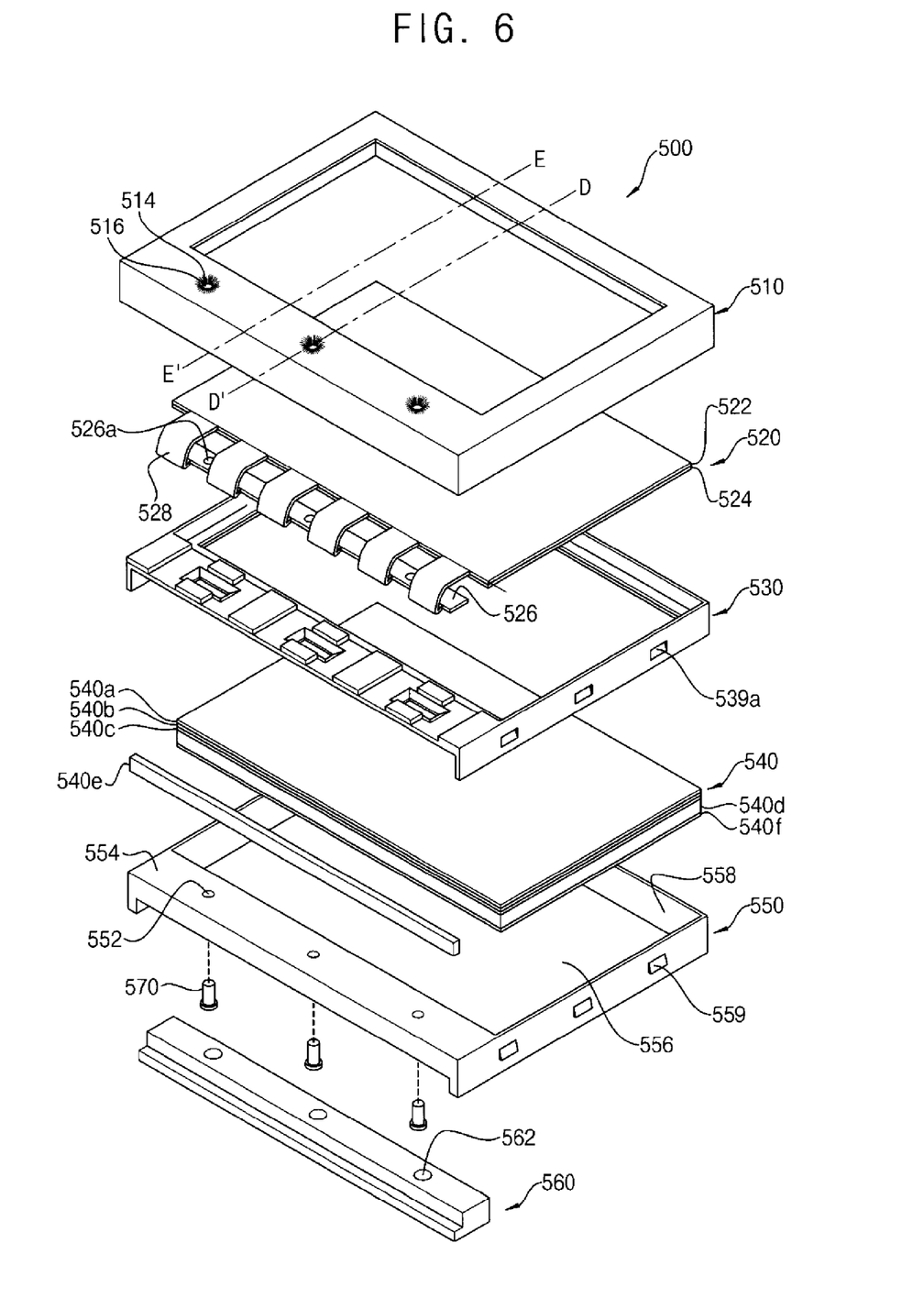
FIG. 6 is an exploded perspective view illustrating a display apparatus according to a second exemplary embodiment of the present invention.
Figure 7:
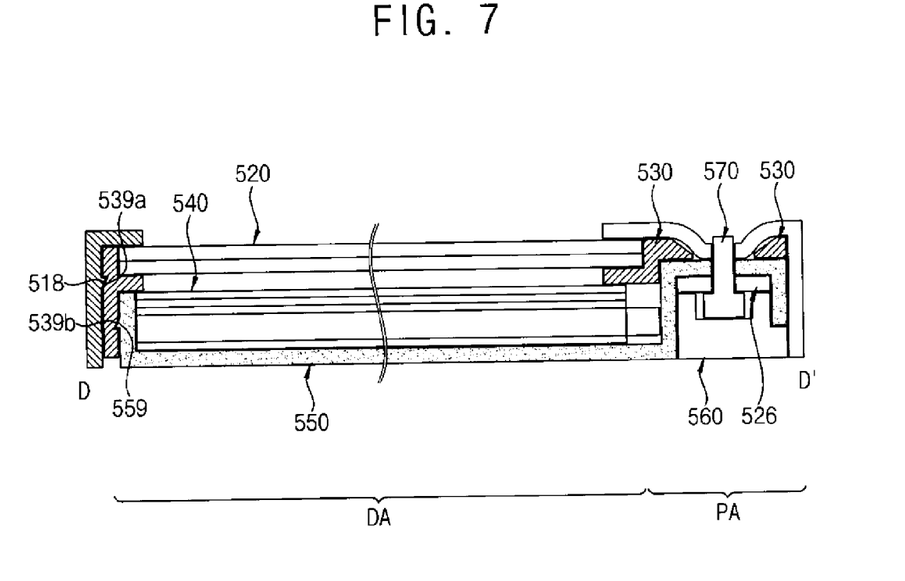
FIG. 7 is a cross-sectional view taken along a line D-D' of FIG. 6.
Figure 8:
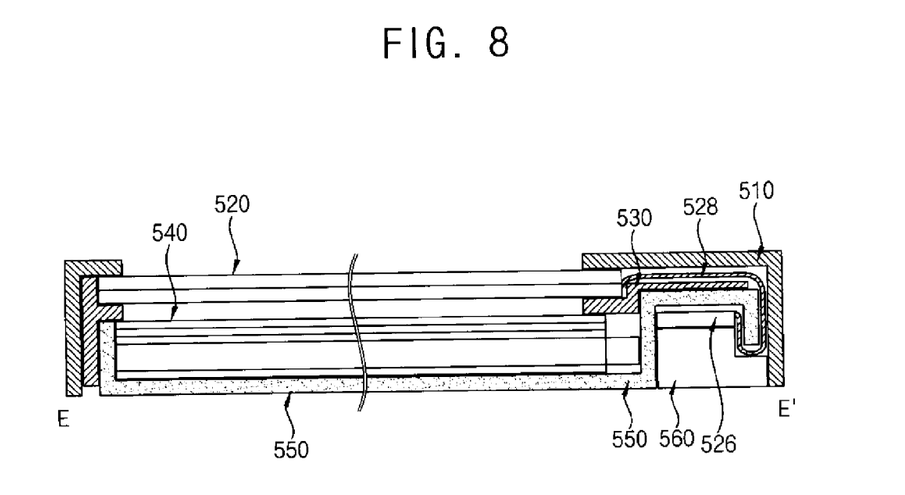
FIG. 8 is a cross-sectional view taken along a line E-E' of FIG. 6.

FIG. 6 is an exploded perspective view illustrating a display apparatus according to another exemplary embodiment of the present invention. FIG. 7 is a cross-sectional view taken along a line D-D' of FIG. 6. FIG. 8 is a cross-sectional view taken along a line E-E' of FIG. 6.

Referring to FIGS. 6 to 7, the display apparatus 500 includes a top chassis 510, a display panel 520, a mold frame 530, a backlight assembly 540, a bottom chassis 550, a bottom cover 560 and a combining part 570. The display apparatus 500 includes a display area DA and a peripheral area PA.

The top chassis 510 may cover a portion of the display panel 520. Alternatively, the top chassis 510 may cover the entire display panel 520. The mold frame 530 receives the display panel 520 to hold the display panel 520. The backlight assembly 540 is disposed under the mold frame 530 and is received in the bottom chassis 550. The combining part 570 pierces the driving part 526, the bottom chassis 550 and the top chassis 510 to fix the top chassis 510, a driving part 526 and the bottom chassis 550 to each other. The bottom cover 560 is received in the bottom chassis 550, so that a portion of the combining part 570 is received in the bottom cover 560 and covered by the bottom cover 560.

The top chassis 510 holds the display panel 520. The top chassis 510 has a first opening 512. The display area DA of the display panel 520 is exposed through the first opening 512. A first hole 516 is formed at a boundary of the top chassis 510 in a plan view. The combining part 570 is inserted through the first hole 516, so that the top chassis 510, the bottom chassis 550 and the driving part 526 are fixed to each other. The first hole 516 may be formed at a first recess 514 which is recessed from a surface of the top chassis 510. Thus, even though the combining part 570 is inserted through the first hole 516, the combining part 570 may be prevented from protruding from the surface of the top chassis 510.

The display panel 520 displays an image on the display area DA according to a driving signal and a data signal applied from outside using a light generated from the backlight assembly 540. The display panel 520 includes a first substrate 524, a second substrate 522 facing the first substrate 524, and a liquid crystal layer (not shown) disposed between the first substrate 524 and the second substrate 522. The display panel 520 is electrically connected to the driving part 526 which drives the display panel 520. For example, a flexible printed circuit board (FPCB) 528 connected to the driving part 526 may be formed. The driving part 526 may be disposed at a same plane as the display panel 520 is disposed. Thus, the driving part 526 is disposed adjacent to a side of the display panel 520, and is connected to the display panel 520 through the FPCB 528, so that a thickness of the display apparatus may be reduced as compared to a display apparatus having a driving part disposed under a display panel.

The FPCB 528 has sufficient length so that the driving part 526 may be disposed under the mold frame 530 and the bottom chassis 550. Thus, the FPCB 528 has a C-shaped cross section, and is connected to a side of the driving part 526.

A second hole 526a is formed through the driving part 526. The second hole 526a is formed at an area corresponding to a third hole 534 of the mold frame 530. Thus, the combining part 570 may sequentially pass through the second hole 526a of the driving part 526 and the first hole 516 of the top chassis 510.

The mold frame 530 will be explained in detail with reference to FIGS. 9 to 10.

The backlight assembly 540 is substantially same as the backlight assembly of FIG. 7. Any further repetitive explanation concerning the above elements will be omitted.

The bottom chassis 550 receives the backlight assembly 540. The bottom chassis 550 includes a receiving space and a peripheral portion 554. The receiving space is formed at an area corresponding to the display area DA. The peripheral portion 554 is formed at an area corresponding to the peripheral area PA. The receiving space includes a bottom portion 556, and a side wall 558. The peripheral portion 554 protrudes from the bottom portion 556. For example, a cross-section of the peripheral portion 554 may have a "C" shape. A fourth hole 552 is formed at the peripheral portion 554, so that the combining part 570 may be inserted therethrough. Thus, the combining part 570 may be inserted through the second hole 526a of the driving part 526, the fourth hole 552 of the bottom chassis 550, and the first hole 516 of the top chassis 510.

For example, the combining part 570 may include a screw. A helicoidal surface is formed inside of the first hole 516 of the top chassis 510. The screw is inserted through the second hole 526a of the driving part 526 and the fourth hole 552 of the bottom chassis 550, so that the screw is combined with the helicoidal surface of the first hole 516 of the top chassis 510. The fourth hole 552 is formed at the peripheral portion 554 protruding from the bottom chassis 550, so that a first recess 514 of the top chassis 510 makes contact with the driving part 526. The driving part 526 is disposed under the peripheral portion 554 of the bottom chassis 550. In the present exemplary embodiment, although the combining part 570 is sequentially inserted through the second hole 526a of the driving part 526, the third hole 534 of the mold frame 530, and the first hole 516 of the top chassis 510, the combining part 570 may instead be sequentially inserted through the first hole 516 of the top chassis 510, the third hole 534 of the mold frame 530 and the second hole 526a of the driving part 526.

In addition, the combining part 570 may have a boss and a groove. A detailed description is substantially the same as a combining structure of FIG. 11, which will be described later. Thus, any further repetitive explanation concerning the above elements will be omitted.

The bottom cover 560 covers a rear surface of the peripheral portion 554 of the bottom chassis 550. The peripheral portion 554 of the bottom chassis 550 protrudes from the bottom portion 556, so that peripheral portion 554 forms a space. The bottom cover 560 is inserted into the space. A groove 562 may be formed on the bottom cover 560. A portion of the bottom chassis 550 and the combining part 570 may be received in the groove 562.

The bottom chassis 550, the backlight assembly 540, the mold frame 530, the display panel 520 and the top chassis 510 are sequentially disposed in the display area DA. The bottom cover 560, the driving part 526, the bottom chassis 550, the mold frame 530, and the top chassis 510 are sequentially disposed in the peripheral area PA. In addition, in a peripheral area PA, the combining part 570 is inserted through the second hole 526a of the driving part 526, the fourth hole 552 of the bottom chassis 550 and the first hole 516 of the top chassis 510.

The FPCB 528 passes through a grooved portion 536b of the mold frame 530. The FPCB 528 is disposed adjacent to a boundary portion of the mold frame 530 and a boundary portion of the bottom chassis 550, so that the FPCB 528 is connected to the driving part 526 disposed under the bottom chassis 550.

Figure 9:
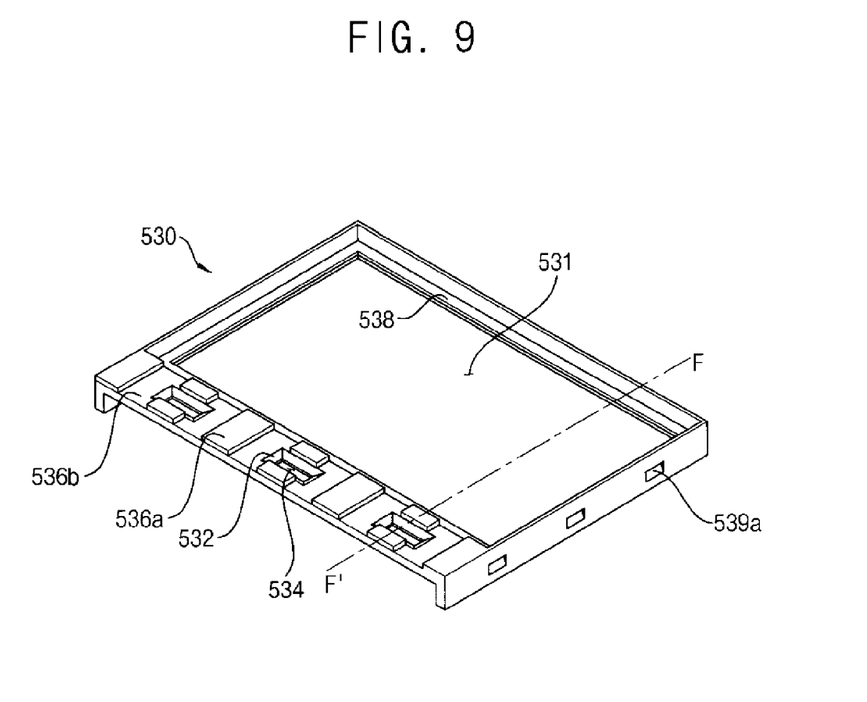
FIG. 9 is a perspective view illustrating a mold frame of FIG. 6.

FIG. 9 is a perspective view illustrating a mold frame of FIG. 6. FIG. 10 is a cross-sectional view taken along a line F-F' of FIG. 9.

Figure 10:
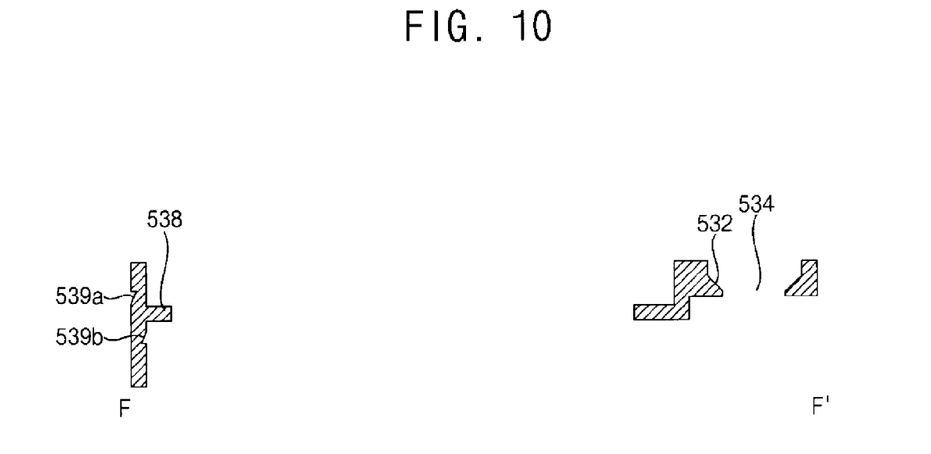
FIG. 10 is a cross-sectional view taken along a line F-F' of FIG. 9.

Referring to FIGS. 9 and 10, the mold frame 530 includes a second opening 531, a second recess 532, a third hole 534, a protrusion 536a, a grooved portion 536b and a supporting portion 538. The mold frame 530 supports the display panel 520 and holds the display panel 520.

The second opening 531 is formed at an area where the backlight assembly 540 supplies light to the display panel 520. Thus, the light from the backlight assembly 540 may be supplied to the display panel 520 through the second opening 531. The second recess 532 is formed at a boundary of the mold frame 530 in a plan view. The third hole 534 is formed at the second recess 532. Thus, the first recess 514 of the top chassis 510 is disposed at a space formed by the second recess 532 of the mold frame 530 and the third hole 534. For example, the second recess 532 may have a rectangular shape having a slanted surface. The third hole 534 may be an opening connected to the slanted surface. The first recess 514 may be received in a space formed by the slanted surface and the opening. The first recess 514 of the top chassis 510 is disposed in the space formed by the second recess 532 of the mold frame 530 and the third hole 534, so that the combining part 570 is sequentially inserted through the second hole 526a of the driving part 526, the fourth hole 552 of the bottom chassis 550 and the first hole 516 of the top chassis 510.

The supporting portion 538 supports the display panel 520 and holds the display panel 520. For example, the supporting portion 538 is formed inside of the mold frame 530. The display panel 520 is disposed on the supporting portion 538.

The protrusion 536a makes contact with the top chassis 510 to hold the top chassis 510. The grooved portion 536b is formed on a surface of the protrusion 536a. The FPCB 528 may be disposed in the grooved portion 536b. Thus, a space is formed between the mold frame 530 and the top chassis 510, and is formed between the bottom chassis 550 and the top chassis 510. The FPCB 528 may be disposed in the space. Thus, the driving part 526 may be disposed under the bottom chassis 550. Thus, when the display panel 520 is combined with the mold frame 530, the FPCB 528 passes through the grooved portion 536b, and is disposed adjacent to the boundary portion of the mold frame 530 and the boundary portion of the bottom chassis 550. Thus, the FPCB 528 is connected to the driving part 526 disposed under the bottom chassis 550.

A plurality of first combining protrusion 518 may be formed inside of a side of the top chassis 510. A plurality of first combining groove 539a may be formed outside of a side of the mold frame 530. The first combining protrusion 518 may be inserted into the first combining groove 539a. In addition, a plurality of second combining protrusion 559 may be formed outside of a side of the bottom chassis 550. A plurality of second combining groove 539b may be formed inside of the side of the mold frame 530. The second combining protrusion 559 may be inserted into the second combining groove 539b. Thus, the top chassis 510, the mold frame 530 and the bottom chassis 550 may be combined together.

Figure 11:
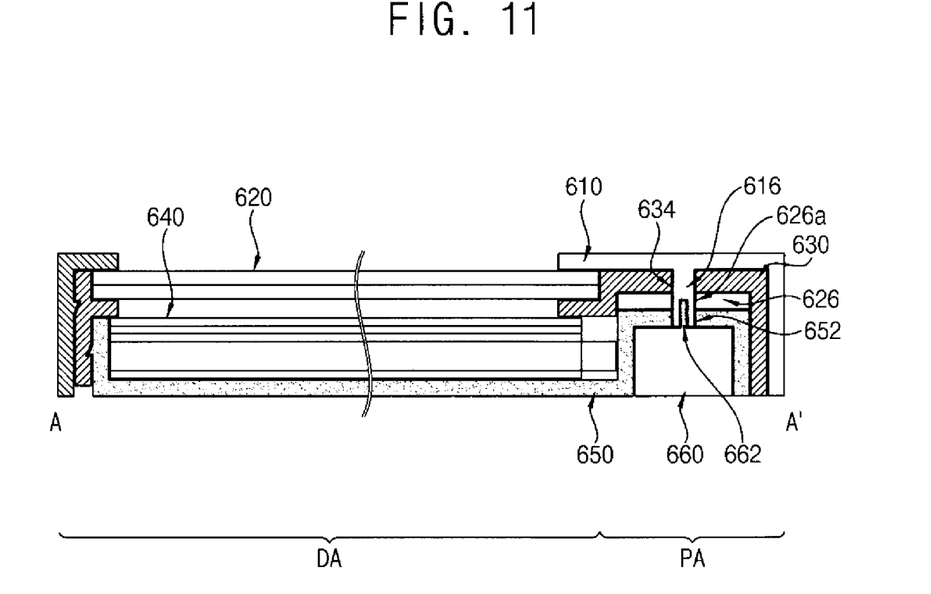
FIG. 11 is cross-sectional view illustrating a display apparatus according to a third exemplary embodiment of the present invention.

FIG. 11 is perspective cross-sectional view illustrating a display apparatus according to still another exemplary embodiment of the present invention.

Referring to FIG. 11, the display apparatus 600 is substantially same as the display apparatus 100 of FIG. 1 except for a boss 662 and a groove 616. The boss 662 and the groove 616 combine a top chassis 610, a mold frame 620, a driving part 626 and a bottom chassis 650. Thus, any further repetitive explanation concerning the above elements will be omitted.

The groove 616 extending toward the mold frame 630 is formed at the top chassis 610. The boss 662 is formed at the bottom cover 660. Thus, the boss 662 is combined with the groove 616.

The groove 616 passes through a third hole 634 of the mold frame 620, a second hole 626a of the driving part 626 and a fourth hole 652 of the bottom chassis 650. The boss 662 is combined with the groove 616, so that the top chassis 610, the mold frame 620, the driving part 626, the bottom chassis 650 and a bottom cover 660 are fixed to each other.

Although not shown in the figures, the top chassis, the mold frame, the driving part and the bottom chassis may be fixed together by any other means that would be known to one of ordinary skill in the art, such as a rivet, snap fastener, and the like.

According to the present invention, the display apparatus includes the combining part combing the top chassis, the mold frame, the driving part and the bottom chassis. Thus, a bezel may be firmly fixed without any further additional combining part.

In addition, the first recess is formed at the top chassis. The combining part is disposed in the first recess, so that the combining part may not be protruded from the top chassis. Thus, a thickness of the display apparatus may be reduced.

Furthermore, the top chassis, the driving part, and the bottom chassis are combined using one combining part so that the manufacturing process of the display apparatus may be simplified.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display apparatus comprising:
a top chassis having a first hole;
a display panel disposed under the top chassis and configured to display an image;
a driving part electrically connected to the display panel, configured to drive the display panel, and having a second hole corresponding to the first hole;
a bottom chassis disposed under the display panel, combined with the top chassis to receive the display panel, and having a fourth hole corresponding to the first and second holes; and
a combining part combining the top chassis, the driving part and the bottom chassis through the first hole, the second hole and the fourth hole,
wherein the first hole is formed in a top surface of the top chassis that is substantially parallel to the display panel.

2. The display apparatus of claim 1, wherein the driving part is disposed adjacent a side of the display panel.

3. The display apparatus of claim 2, wherein the top chassis comprises a display area and a peripheral area adjacent the display area, the display area comprising an opening exposing the display panel and the first hole is formed in the peripheral area of the top chassis,
wherein the driving part is disposed under the peripheral area of the top chassis.

4. The display apparatus of claim 3, wherein the combining part comprises a screw, and
wherein a helicoidal surface configured to be combined with the screw is formed inside the fourth hole of the bottom chassis.

5. The display apparatus of claim 3, wherein the top chassis comprises a first recess formed adjacent to the first hole.

6. The display apparatus of claim 5, wherein the driving part contacts the first recess of the top chassis.

7. The display apparatus of claim 2, wherein the bottom chassis comprises a bottom portion, a side wall extending from the bottom portion and a peripheral portion protruding from the bottom portion toward the top chassis,
the peripheral portion extends from the side wall,
the bottom portion, the side wall and the peripheral portion form a receiving space to receive a backlight assembly, and
wherein the driving part is disposed between the top chassis and the protruding peripheral portion of the bottom chassis.

8. The display apparatus of claim 2, further comprising:
a flexible printed circuit board (FPCB) configured to electrically connect the driving part and the display panel,
wherein the bottom chassis comprises a bottom portion and a peripheral portion protruding from the bottom portion toward the top chassis, and
wherein the driving part is disposed under the peripheral portion of the bottom chassis, and a portion of the FPCB is disposed under the bottom chassis.

9. The display apparatus of claim 2, further comprising:
a mold frame supporting the display panel and received in a space between the top chassis and the bottom chassis, and having a third hole corresponding to the first, second and fourth hole, and
wherein the combining part combines the top chassis, the driving part, the molds frame and the bottom chassis through the first to fourth holes.

10. The display apparatus of claim 9, further comprising:
a flexible printed circuit board (FPCB) configured to electrically connect the driving part to the display panel,
wherein the mold frame includes a protrusion on which the display panel is disposed and a grooved portion through which the FPCB connects the driving part to the display panel.

11. The display apparatus of claim 9, wherein the top chassis comprises a display area and a peripheral area adjacent to the display area, the display area comprising an opening exposing the display panel and a first hole is formed in the peripheral area of the top chassis.

12. The display apparatus of claim 11, further comprising:
an FPCB electrically connecting the driving part and the display panel,
wherein the mold frame comprises a supporting portion on which the display panel is disposed, a protrusion contacting the top chassis, and a grooved portion through which the FPCB connects the driving part to the display panel.

13. The display apparatus of claim 11, wherein the top chassis comprises a first recess formed adjacent to the first hole and the mold frame includes a second recess formed adjacent to the third hole, and
wherein the first recess is disposed in a space formed by the second recess and the third hole.

14. The display apparatus of claim 12, wherein the driving part contacts the first recess of the top chassis.

15. The display apparatus of claim 12, further comprising:
a bottom cover disposed under the bottom chassis.

16. The display apparatus of claim 9, further comprising a backlight assembly received in the bottom chassis, wherein the top chassis comprises a display area and a peripheral area adjacent the display area, the display area comprising an opening exposing the display panel and the first hole is formed in the peripheral area of the top chassis, the driving part is disposed under the peripheral area of the top chassis, and the bottom chassis, the backlight assembly, the mold frame, the display panel, and the top chassis are sequentially disposed in the display area.

17. The display apparatus of claim 16, further comprising a bottom cover disposed under the bottom chassis, wherein the bottom cover, the bottom chassis, the driving part, the mold frame, and the top chassis are sequentially disposed in the peripheral area.

18. The display apparatus of claim 16, further comprising a bottom cover disposed under the bottom chassis, wherein the bottom cover, the driving part, the bottom chassis, the mold frame, and the top chassis are sequentially disposed in the peripheral area.

19. The display apparatus of claim 1, wherein the driving part comprises a printed circuit board.

20. A display apparatus comprising:

a top chassis having a plurality of first holes;

a display panel disposed under the top chassis and configured to display an image;

a driving part electrically connected to the display panel, configured to drive the display panel, and having a plurality of second holes corresponding to the first holes;

a bottom chassis disposed under the display panel, combined with the top chassis to receive the display panel, and having a plurality of fourth holes corresponding to the first and second holes; and a combining part combining the top chassis, the driving part, and the bottom chassis through the first holes, the second holes, and the fourth holes, wherein the first holes are formed in a top surface of one side of the top chassis that is substantially parallel to the display panel.

* * * * *